No. 749,252. PATENTED JAN. 12, 1904.
L. ANDREWS.
SYNCHRONIZER.
APPLICATION FILED JUNE 25, 1903.
NO MODEL. 2 SHEETS—SHEET 1.

WITNESSES: INVENTOR.
Leonard Andrews.
BY
L. A. Hawkins
ATTORNEY.

No. 749,252. PATENTED JAN. 12, 1904.
L. ANDREWS.
SYNCHRONIZER.
APPLICATION FILED JUNE 25, 1903.
NO MODEL. 2 SHEETS—SHEET 2.

WITNESSES:
INVENTOR.
Leonard Andrews.
BY L. A. Hawkins
ATTORNEY.

No. 749,252. Patented January 12, 1904.

UNITED STATES PATENT OFFICE.

LEONARD ANDREWS, OF MANCHESTER, ENGLAND, ASSIGNOR TO STANLEY ELECTRIC MANUFACTURING COMPANY, OF PITTSFIELD, MASSACHUSETTS, A CORPORATION OF NEW JERSEY.

SYNCHRONIZER.

SPECIFICATION forming part of Letters Patent No. 749,252, dated January 12, 1904.

Application filed June 25, 1903. Serial No. 163,012. (No model.)

*To all whom it may concern:*

Be it known that I, LEONARD ANDREWS, a subject of the King of England, and a resident of Manchester, England, have invented certain new and useful Improvements in Synchronizers, of which the following is a specification.

My invention relates to the synchronizing of alternating-current apparatus—such as generators, synchronous motors, rotary converters, &c.—and is especially applicable to polyphase machines.

The object of my invention is to provide means to indicate when the incoming machine is at the proper speed or if not at the proper speed whether it is running too fast or too slow and also to indicate when it is exactly in phase with the bus-bars to which it is to be connected. By means of my invention I am able to give these indications without the addition of moving parts, which introduce complication and inaccuracy due to frictional lag, and also to give indications which may be clearly and unmistakably read from a distance. This last point is of great importance when the speed of the incoming machine must be controlled at some distance from the switchboard.

Figure 1:
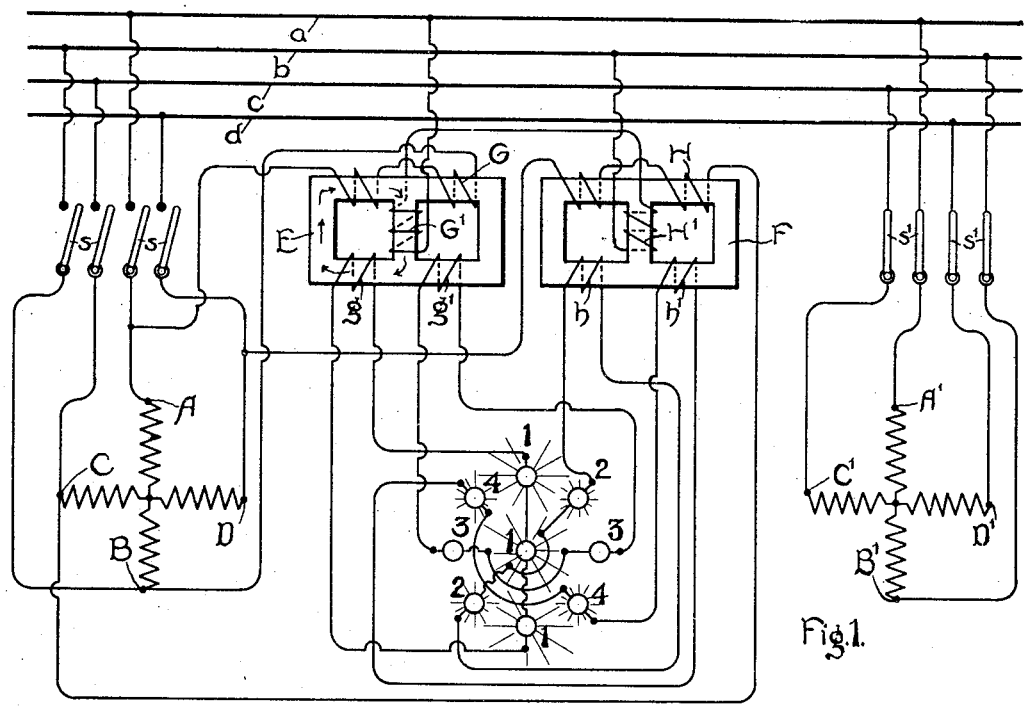
Figure 2:
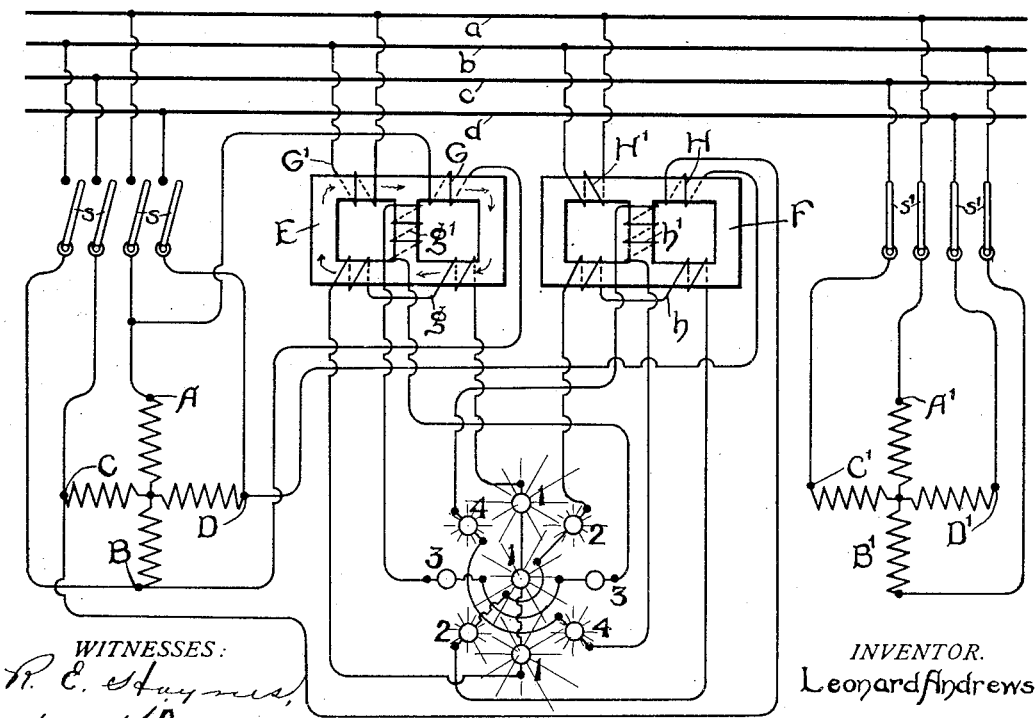
Figure 3:
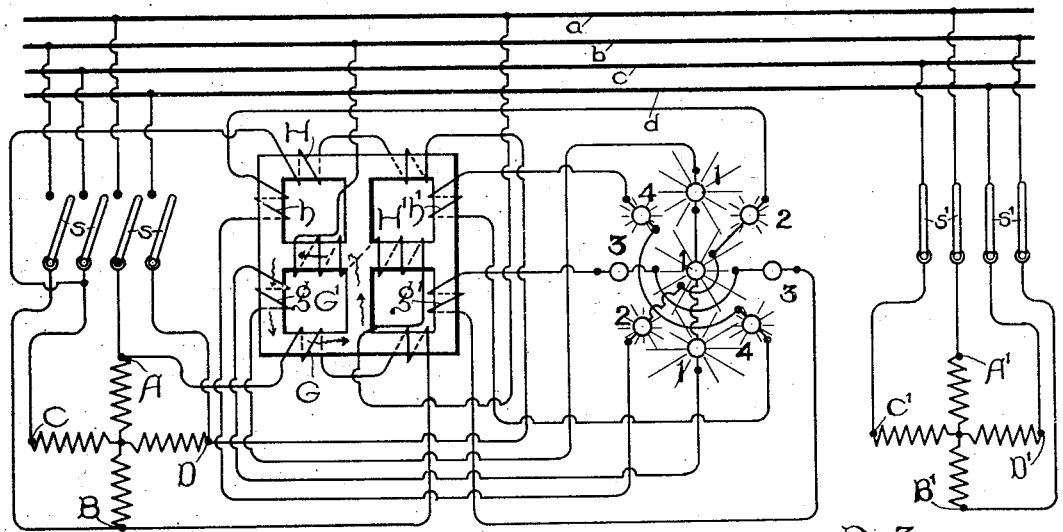
Figure 4:
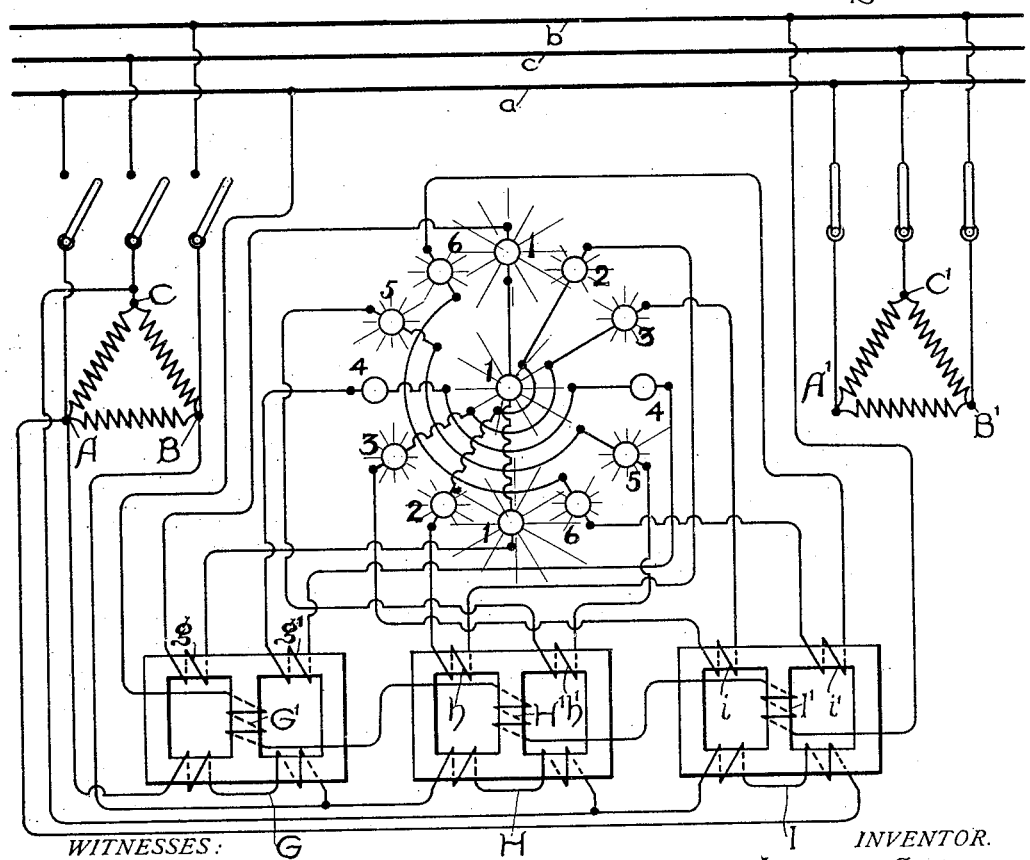

Referring to the drawings, Figure 1 shows diagrammatically an embodiment of my invention applied to a two-phase machine. Fig. 2 shows a modification of the same. Fig. 3 shows a further modification. Fig. 4 shows diagrammatically my invention applied to a three-phase machine.

In Fig. 1, A B and C D represent the phases of a two-phase generator which is to be connected to the bus-bars $a\ b\ c\ d$, which are already energized by phases A' B' and C' D' of a second generator. $s\ s$ represent the switches by which the generator may be disconnected from the bus-bars. E F represent two synchronizing transformers. Transformer E has a primary winding G, connected to generator-phase A B. Transformer F has a similar primary winding H, connected to generator-phase C D. Transformers E and F both have second primary windings G' and H', connected to bus-bars $a\ b$. The transformers also carry two secondary windings $g\ g'$ and $h\ h'$, which are connected, respectively, to lamps 1 3 and 2 4. The primary windings on the transformers are so disposed that when the voltage of generator-phase A B coincides with the phase of the voltage on bus-bars $a\ b$ the flux in transformer E is as indicated by the arrows. It is evident that the flux produced by the two primaries assist each other in that part of the core on which is wound secondary $g$ and oppose each other in that part of the core on which is wound secondary $g'$. Thus it is evident that lamps 1 1 will be illuminated and lamps 3 3 will be dark. In transformer F the fluxes produced by primaries H and H' are evidently ninety degrees out of phase, and consequently oppose each other half the time and assist each other half the time in the two magnetic circuits on which are wound the secondaries $h\ h'$. Thus the lamps 2 2 and 4 4 will be illuminated, but with only about half their normal brilliancy. The circle of lamps shown in Fig. 1 will thus be bright at 1 1, dark at 3 3, and of half brilliancy at the intermediate points. If now the phase of the generator voltage changes by ninety degrees with reference to that of the bus-bars, it is evident that lamps 2 2 or 4 4 will reach a maximum brilliancy, while the other pair will go out. It is also evident that the bright points on the circle of lamps will be shifted in one direction or the other, according as the generator is running at too high or too low speed. The brilliant points will revolve around the circle one revolution for every cycle that the generator loses or gains with reference to the bus-bars. When the generator is running at the proper speed, the bright points on the circle will become stationary, and the position of the bright point shows the phase relation of the generator phase to the bus-bars. When lamps 1 1 remain steadily illuminated, the generator is at the correct speed and proper phase for connection to the bus-bars.

In Fig. 2 is shown a modification of the arrangement of primaries and secondaries. That the same results are attained as in the arrangement of Fig. 1 is clearly shown by the drawings. It is evident that the two magnetic circuits of each transformer in Fig. 1 may be separated, so as to form four transformers each having a single magnetic circuit, or, on the other hand, the two transformers may be combined into one, so as to form a single transformer having four magnetic circuits. This latter arrangement is shown in Fig. 3 and requires no further explanation.

Fig. 4 shows my invention applied to a three-phase machine. The arrangement will be obvious from the foregoing description and from the drawings.

My invention may evidently be used with single-phase machines by the addition of phase-splitting devices. Many of such devices are well known to the art and need no description, nor is it necessary to illustrate them in the drawings, since the circuit connections are in no wise altered by their use.

It is evident that by my arrangement I do away with all complications due to moving parts, and thereby obviate the inaccuracies arising from the frictional lag in such moving parts. Furthermore, the circle of lamps furnishes an indication which can be read unmistakably at a much greater distance than is possible with any revolving needle.

I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. In combination, a polyphase generator, bus-bars, transformers each having a primary winding connected to one of the different phases of said generator, and a second primary winding connected to a common pair of bus-bars, two secondary windings on said transformers so disposed relatively to said primary windings that one of said secondaries is excited when the currents of said primaries are in phase and the other when the currents are in opposition, and electroresponsive devices connected to said secondaries.

2. In combination, a polyphase generator, bus-bars, transformers each having a primary winding connected to one of the different phases of said generator and a second primary winding connected to a common pair of bus-bars, two magnetic circuits in each transformer adapted to be magnetized, one similarly and the other oppositely, for any given phase relation of current in the primaries, a secondary winding on each of said magnetic circuits, and an indicating device connected to each of said secondary windings.

3. In combination, a polyphase generator, bus-bars, a synchronizing transformer for each phase of said generator, each of said transformers having two magnetic circuits, means for producing in one circuit of each of said transformers, an alternating flux varying in strength with the difference in phase between the voltages of one phase of the generator and of a common pair of bus-bars and in the other circuit a flux varying inversely with said difference, a secondary winding on each of said magnetic circuits, and an electroresponsive device connected to each of said secondary windings.

4. In combination, a polyphase generator, bus-bars, a synchronizing transformer having two magnetic circuits, means for producing in one of said circuits an alternating flux varying in strength with the difference in phase between the voltage of one phase of the generator and of one pair of bus-bars and in the other circuit a flux varying inversely with said difference, windings adapted to be excited by said fluxes, and indicating devices connected to said windings.

5. In combination, a polyphase generator, station bus-bars, a plurality of magnetic circuits, means for producing in one of said circuits an alternating flux varying in strength with the difference in phase between the voltages of one phase of said generator and of one pair of bus-bars and in a second circuit a flux varying inversely with said difference and in the other circuits fluxes similarly depending on the phase difference of the other generator phases and of the same pair of bus-bars, windings on said magnetic circuits, and electroresponsive devices connected to said windings.

6. In combination, a polyphase generator, station bus-bars, a plurality of magnetic circuits, means for producing in said circuits two fluxes for each phase of the generator bearing different relations to the phase difference of said generator phase and a common pair of bus-bars, windings on said magnetic circuits, and indicating devices connected to said windings.

7. In combination, a polyphase generator, station bus-bars, primary transformer-windings severally connected to the different phases of said generator, primary transformer-windings all connected to a common pair of bus-bars, secondary windings so disposed as to be excited by said primary windings conjointly and oppositely, and electroresponsive devices connected to said secondary windings.

8. In combination, a polyphase generator, station bus-bars, primary transformer-windings each connected to a different phase of said generator, primary transformer-windings all connected to a common pair of bus-bars, secondary windings disposed in pairs so that one of each of said pairs is excited conjointly by one of said generator-connected primaries and by one of said bus-connected primaries, and the other of said pair is excited oppositely by said primaries, and indicating devices connected to said secondary windings.

9. In combination, a polyphase generator, station bus-bars, a synchronizing transformer for each phase of the generator, two primaries thereon, one of said primaries being connected to its generator phase and the other to a common pair of bus-bars, two secondaries so disposed that one is excited conjointly and the other oppositely by said primaries when the currents in said primaries are in phase, and electroresponsive devices connected to said secondaries.

10. In combination, an alternating-current generator, station bus-bars, a synchronizing transformer having two magnetic circuits, means for producing in one of said circuits an alternating flux varying in strength with the difference in phase of the voltages of said generator and said bus-bars and in the other of said circuits a flux varying inversely with said difference, a secondary winding on each of said circuits, and indicating devices connected to said secondaries.

11. In combination, an alternating-current generator, station bus-bars, a synchronizing transformer, two secondaries thereon, means for producing in one of said secondaries an electromotive force varying in intensity with the difference in phase with the voltages of said generator and said bus-bars and in the other of said secondaries an electromotive force varying inversely with said difference, and indicating devices connected to said secondaries.

Signed at Pittsfield, Massachusetts, this 16th day of June, 1903.

LEONARD ANDREWS.

Witnesses:
L. S. HAWKINS,
R. E. HAYNES.